2,899,298

PROCESS OF PRODUCING SHAPED PLUTONIUM

Robert J. Anicetti, Richland, Wash., assignor to the United States of America as represented by the United States Atomic Energy Commission No Drawing. Application March 9, 1954
Serial No. 415,185

2 Claims. (Cl. 75—84.1)

This invention deals with a refractory material, for instance for crucibles which are to be used for metal production, such as the production of plutonium by the reduction of plutonium tetrafluoride with calcium, and for casting the metals. The invention is also concerned with the crucibles containing, or consisting of, the refractory material, and with the process of making the crucibles.

Heretofore the reduction of plutonium tetrafluoride with metallic calcium has been effected in crucibles of magnesium oxide. The plutonium obtained thereby had an undesirably high content of magnesium which made remelting of the plutonium in vacuum necessary. This vacuum melting step then also served for casting the plutonium into the shape required. The surface of the recast plutonium article was then finished by machining.

Other materials have been tried in the preparation of crucibles for plutonium production. Calcium oxide has been used and also calcium fluoride; both yielded a plutonium of a satisfactory degree of purity. However, calcium oxide crucibles showed the disadvantage that they were too weak when fired at relatively low temperatures and that heating to at least 1750° C., but preferably to above 1850° C., was therefore necessary to obtain a well-bonded, firm crucible. Calcium fluoride crucibles, on the other hand, showed poor shock resistance at elevated temperature and furthermore made the plutonium recovery from waste, the slag and the crucible, by solvent extraction rather involved due to complex formation of the fluoride anion with the plutonium.

It is an object of this invention to provide a refractory material for crucibles for metal production with which the metal is obtained in a high degree of purity.

It is another object of this invention to provide a refractory material for crucibles the use of which makes recasting of the metal produced unnecessary.

It is another object of this invention to provide a refractory material for crucibles the use of which makes possible that production of the metal compound and casting of the metal produced are carried out in one step.

It is still another object of this invention to provide refractory crucibles which have good shock resistance at elevated temperature.

It is finally also an object of this invention to provide a refractory material and crucibles therefrom which allow the production of plutonium metal in a very economical manner.

These and other objects are accomplished by mixing electrically fused disintegrated calcium oxide with calcium fluoride in a quantity to obtain a content of from 2 to 10% by weight of calcium fluoride in the mixture, pressing the mixture into the shape of the crucible desired and firing the shaped crucible.

Firing is preferably carried out at temperatures between 1260 and 1370° C. If, after the metal production, processing of the waste (slag and/or crucible), for instance by solvent extraction, is intended, all fluoride content is preferably eliminated from the crucible for the purpose of preventing complex formation between fluoride anion and metal and thus facilitating extraction. This is advantageously done by carrying out another heating step after the firing to at least 1800° C. whereby the calcium fluoride is volatilized. However, this additional heating step is not necessary if the metal production is to be effected from the charge only and the crucible is to be discarded.

The shape of the crucible may vary widely and is not part of the invention. According to this invention the inner surface of the crucible is formed so that it has the predetermined shape of the final article and can serve as a mold. Since the plutonium or other metal obtained in the crucibles of the invention is sufficiently pure to make recasting unnecessary, reduction of the metal compound and casting of the metal are thus accomplished in one single step. For most purposes a cylindrically shaped crucible with a hemisphere-like bottom has been preferred, and in this case the plutonium button formed at the bottom of the crucible is of hemispherical shape. The surface of the button may be finished by machining.

It will be understood that this invention is not to be limited to the details given herein but that it may be modified within the scope of the appended claims.

What is claimed is:

1. A process of producing and casting high-purity plutonium metal in one step from plutonium tetrafluoride, comprising heating, a mixture of the plutonium tetrafluoride with calcium while said mixture is in contact with and defined as to shape by a material obtained by firing a mixture consisting of calcium oxide and from 2 to 10% by its weight of calcium fluoride at from 1260° to 1370° C.

2. The process of claim 1 wherein said material has been subjected to a second firing step at at least 1800° C. prior to its use for the plutonium production.

References Cited in the file of this patent

UNITED STATES PATENTS

| | | |
|---|---|---|
| 218,315 | Riley | Aug. 5, 1879 |
| 265,962 | Henderson | Oct. 17, 1882 |